United States Patent
Rakshit (10) Patent No.: US 11,615,645 B2
(45) Date of Patent: Mar. 28, 2023

(54) AUTOMATED PRESENTATION CONTRIBUTIONS

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 16/687,950

(22) Filed: Nov. 19, 2019

(65) Prior Publication Data

US 2021/0150382 A1    May 20, 2021

(51) Int. Cl.
  *G06V 40/16*    (2022.01)
  *G06Q 10/101*   (2023.01)
  *G06N 5/022*    (2023.01)

(52) U.S. Cl.
  CPC ........... *G06V 40/172* (2022.01); *G06N 5/022* (2013.01); *G06Q 10/101* (2013.01)

(58) Field of Classification Search
  None
  See application file for complete search history.

(56) References Cited

U.S. PATENT DOCUMENTS

| | | | |
|---|---|---|---|
| 2012/0331404 A1* | 12/2012 | Buford | G06Q 10/10 715/757 |
| 2016/0373571 A1 | 12/2016 | Woolsey et al. | |
| 2017/0039527 A1* | 2/2017 | Rangan | G06Q 10/1095 |
| 2018/0032997 A1* | 2/2018 | Gordon | G06Q 30/0269 |
| 2018/0098030 A1 | 4/2018 | Morabia et al. | |
| 2019/0132265 A1 | 5/2019 | Nowak-Przygodzki et al. | |
| 2019/0189117 A1 | 6/2019 | Kumar | |
| 2019/0379822 A1* | 12/2019 | Leong | G06F 1/1626 |
| 2021/0004443 A1* | 1/2021 | Sapugay | G06F 16/24556 |
| 2021/0250390 A1* | 8/2021 | Clark | G06K 9/6215 |

OTHER PUBLICATIONS

"Over.ai | Voice AI Representative" Over.ai, printed Nov. 18, 2019, 8 pages, available at https://web.archive.org/web/20190806211426/https://over.ai/answering-machine/.

Vincent, "Google's AI sounds like a human on the phone—should we be worried?" The Verge, May 9, 2018, 9 pages, https://www.theverge.com/2018/5/9/17334658/google-ai-phone-call-assistant-duplex-ethical-social-implications.

Genial AI, "Healthcare Answering Services," 2019, 5 pages, https://www.genial-ai.com/.

"Hello Alexa, Let's Join the Meeting," Digital Transformation, Viewpoints, Dec. 7, 2017, 6 pages http://digitaltransformation.frost.com/expert-insights/viewpoints/hello-alexa-lets-join-meeting/.

Johnson, "Alexa can now schedule meetings with your contacts," VB, May 22, 2018, 8 pages https://venturebeat.com/2018/05/22/alexa-can-now-schedule-meetings-with-your-contacts/.

(Continued)

*Primary Examiner* — Mandrita Brahmachari
(74) *Attorney, Agent, or Firm* — Kelsey M. Skodje (57) ABSTRACT

A system can monitor a presentation and an audience. While monitoring the presentation and audience, the system can determine questions that would be beneficial for the audience to ask. The system can also ask these questions on behalf of the audience or wait to allow the audience the opportunity to ask the questions themselves. The system can learn over time to better determine which questions are suited for which audiences and presentations.

20 Claims, 5 Drawing Sheets

(56) References Cited

OTHER PUBLICATIONS

Darrow, "Amazon Alexa Is Going to the Office," Fortune, Tech PointCloud, Mar. 28, 2017, 8 pages https://fortune.com/2017/03/28/amazon-alexa-echo-teem/.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

AUTOMATED PRESENTATION CONTRIBUTIONS

BACKGROUND

The present disclosure relates to software, and more specifically, to detecting and asking questions relating to a presentation on behalf of an audience.

Presentations are a central component of multiple aspects of modern business. A presenter may display and/or discuss important information to an audience. The audience may be present in person or may be viewing remotely, such as over the internet. Many presentations include opportunities for audience members to ask questions.

Machine learning systems leverage data from a number of sources to make a prediction or determination. Further, these systems are capable of learning over time based on feedback on their previous outputs. Machine learning system may be "trained" to correlate a state of an environment with a conclusion. For example, a system may determine that, when data from a thermometer indicates a relatively low indoor temperature, a user is more likely to activate an indoor heating system. Over time, the system may discern a temperature below which the user is nearly certain to activate the heater and begin to automatically activate the heater without the user needing to. If the user turns off the heater shortly after the system activated it, the system may learn that its prediction was incorrect, and adjust its future determinations accordingly.

SUMMARY

Some embodiments of the present disclosure can be illustrated as a method. The method may include monitoring a presentation, the presentation including an audience having one or more audience members. The method may further include determining, based on the monitoring, a potential contribution and whether the potential contribution comprises an appropriate contribution. The method may further include, responsive to a determination that the potential contribution comprises an appropriate contribution, making the appropriate contribution.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may include a plurality of CPU cores configured to monitor a presentation, the presentation including an audience having one or more audience members, determine, based on the monitoring, a potential contribution and whether the potential contribution comprises an appropriate contribution, and, responsive to a determination that the potential contribution comprises an appropriate contribution, make the appropriate contribution.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to a system and method to ask questions on behalf of a presentation audience. More particular aspects relate to a system to monitor a presentation and its audience, identify questions that the audience or presenter is likely to want addressed, ask the question(s) when an opportunity to do so is detected, and/or learn from the results of asking the question.

While audience questions may be a core source of value for many presentations, audience members may be hesitant to ask questions (even questions the member(s) deem "important") for a variety of reasons. For example, audience members may fear repercussions for asking "difficult" questions or because of implications such questions may confer—an audience of employees may all independently want to ask the same questions regarding salary or raises, but each may be afraid of appearing greedy to employers or coworkers and so may refrain from asking, often in the hopes that someone else does. In some cases, audience members may simply feel a social pressure to remain silent or be afraid of "looking stupid" in front of peers, coworkers, superiors, etc. Thus, many audience members may decide that the possible knowledge gained in having a question answered is not worth the "risk" (real or perceived) of asking the question in the first place. If all audience members that want an answer make similar conclusions, then even though several or possibly even all audience members want to ask the same question, the question is likely to go unasked (and thus unanswered).

If many audience members share the same question, a presenter may want to answer that question. Thus, many presenters who are aware of audience hesitation may attempt to overcome it in a variety of ways. For example, a presenter may explicitly encourage questions from the audience, implement a way to ask questions anonymously in an attempt to circumvent any social concerns, or may attempt to predict what these questions may be and answer them preemptively. However, these conventional approaches may still require participation from audience members who are inclined to avoid participation for any of a number of reasons, and/or require accurate foresight from presenters who may not fully understand the concerns of the audience.

Further, in some cases audience members may not think of a question to ask, even if information that may be pertinent to the member is initially undisclosed. For example, if a presentation regarding employee compensation fails to cover a specific issue such as vacation accrual, it is possible that no audience member actually thinks to ask about vacation accrual even if most or all of the audience members would benefit from elaboration on the topic.

Throughout this disclosure, reference is made to one or more "presentations." As used herein, "presentation" may refer to an event wherein information is provided to an "audience," which may include a plurality of people that are at the presentation for the sake of the information. The presentation may be prepared, managed and/or held by one or more "presenters." The information may be dispensed through a variety of means, including using media devices such as projector screens, speakers, and the like as well as speeches or monologues given by presenters. Examples of presentations may include slide shows, speeches, videos, meetings, training sessions, etc. A presentation may cover one or more "subjects," which, as used herein, includes one or more "topics." To be clear, as used herein, a "topic" is a more specific term than "subject." As an example, "employee compensation" may be a "subject" of a presentation, and a presentation on the subject of "employee compensation" may cover several topics, such as "pay periods," "salary," "benefits," etc. The same presentation may later cover a different subject, such as "workplace expectations" including topics like "dress code," "work hours," etc.

A presentation's audience consists of one or more audience members, some or all of whom may be local (meaning in or near the same physical location as the presenter) or remote (meaning participating in the presentation through some other means such as via an internet stream). Some presentations may allow audience members to ask questions or make contributions at any time during the presentation, while some presentations may have set windows for questions.

Throughout this disclosure, reference is made to "augmenting" an audience. As used herein, "augmenting" an audience refers to supplementing audience participation in a presentation. Examples of augmenting an audience include determining questions that one or more audience members may want answered, submitting questions to a presenter, prompting a presenter to clarify aspects of a presentation, providing information before, during or after a presentation, etc.

In some embodiments, presenters may not necessarily be actively participating during some or all of a presentation. For example, a presentation may include a video for audience members to watch, during or after which audience members may be permitted to submit questions or feedback. While the video may be prepared (or at least selected) by one or more presenters, the presenters are not necessarily available for questions during playback of the video. In some embodiments, presenters may be physically present in a room or other location with some or all of the audience members (e.g., giving a speech, explaining slides of a slide show, etc.).

Figure 1:
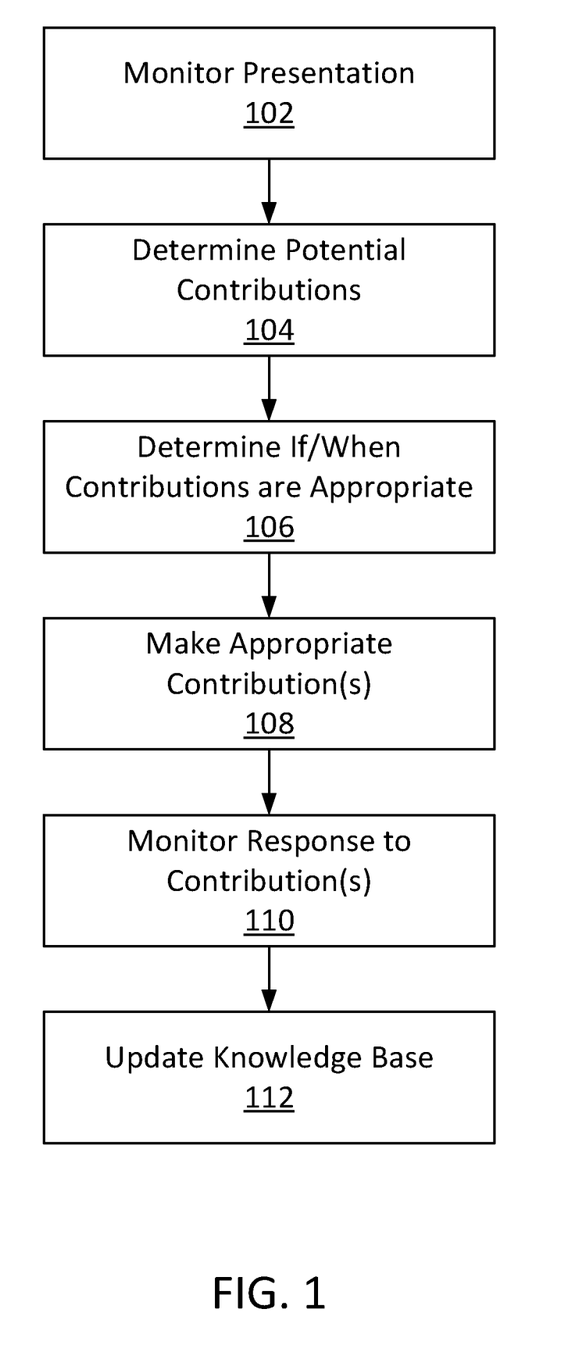
FIG. 1 illustrates a high-level block diagram of an audience augmentation method according to several embodiments of the present disclosure.

FIG. 1 illustrates a high-level block diagram of an audience augmentation method 100 according to several embodiments of the present disclosure. Method 100 includes monitoring a presentation 102. This may include, for example, utilizing one or more sensors such as microphones, cameras, etc., to collect information on a presentation and/or an audience. In some embodiments, this may include collecting digital information (for example, a presentation file such as a slide show file or a video file).

Monitoring 102 further includes performing analysis on collected information such as, for example, voice analysis, facial recognition, text analysis, image recognition, etc. The information can be analyzed to determine a current subject being discussed or described during the presentation. For example, a current subject may be detected to be "employee salaries" based on identifying keywords correlated with the subject of employee salaries (e.g., "raise," "bonus," "compensation," "salary," etc.). This identification may be performed via analysis of text on one or more slides of a slide show and/or speech-to-text determinations of what a presenter has said. In some embodiments, a system configured to perform method 100 may be trained to determine the current subject using one or more machine learning methodologies (e.g., a convolutional neural network (CNN), recombinant neural network (RNN), etc.). In some embodiments, the current subject may be determined based, at least in part, on a determined identity of one or more presenters and/or audience members, where identities may be determined via facial recognition, guest/speaker lists, etc.

Method 100 further includes determining potential contributions 104. This may include, for example determining whether a topic or issue that is typically relevant to the current subject has been addressed or not. For example, if the current subject is determined to be "employee salaries" based on monitoring 102, then operation 104 may include a list of important topics or questions associated with the subject of employee salaries (e.g., typical raises, benefits, pay periods, etc.). This topic list may be manually set (by, for example, a provider of a system that performs or is expected to perform method 100 such as system 200 of FIG. 2). In some embodiments, the topic list may be generated based on historical data, such as questions asked (or topics covered) during previous presentations covering the same or a substantially similar subject. For example, in some embodiments a system to perform method 100 such as system 200 of FIG. 2 may be initially trained by monitoring multiple presentations on a subject. During training, the system may attempt to determine topics covered and/or questions asked. Results of the attempts may be compared to known values, enabling the system to refine its determination in line with various machine learning methodologies.

Once the system is deemed capable of reliably determining topics covered with regard to presentations on a particular subject (or, in some embodiments, with regard to a particular audience, a particular presenter, or a combination thereof), the system may proceed to a second training to detect correlations between subject and questions asked/topics covered. Once trained, the system may be capable of identifying "gaps" in topic coverage for future presentations on the same subject. As one example, a system may determine that, during training, the topic of "benefits" was discussed during every presentation on employee salaries (where "benefits" may either be directly mentioned by the presenter or presentation materials, or asked about by an audience member). If this system is monitoring another "employee salary" presentation and detects that "benefits"

has not been discussed, then operation 104 may include identifying a "benefits"-related question as a potential question to ask.

The exact structure of the contribution may vary; in some embodiments, it may simply be a keyword (such as, for example, "benefits") to prompt a presenter to cover the topic or prompt one or more audience members to ask about the topic. In some embodiments, operation 104 may include determining a full sentence question (such as, for example, "what benefits do employees receive?"). A full sentence question may be partly or fully based on a previously observed question from an earlier presentation. Operation 104 may result in determining multiple potential contributions.

In some embodiments, potential contributions may be assigned a weight value to represent how important they are or likely they are to be helpful. This weight value may be based on historical data. For example, a topic that is always covered in similar presentations but has not yet been covered in the current presentation may generally have a higher weight value than a topic that is rarely covered in similar presentations. As another example, recognition of specific audience members who have been part of audiences to similar presentations in the past may affect weight value as well—in some embodiments, the weight value may be lowered if every audience member has already had a particular topic explained in previous presentations, as they may be expected to already know about it, and thus covering it may risk wasting time and annoying or boring the audience. However, in some embodiments, an audience member repeatedly asking about the same topic in various presentations may indicate that the audience member could benefit from further explanation.

In some embodiments, operation 104 may include determining, based on image and/or facial recognition information from one or more cameras, an emotional state of one or more audience members. This may help indicate whether clarification or further explanation would benefit the audience and/or the presenter. For example, if facial recognition information indicates that the audience is confused (based on, for example, determining that a number of audience members making faces correlated with confusion is above a particular threshold), then a system such as system 200 of FIG. 2 may be more likely to make the potential contribution(s), or at least more likely to make them sooner rather than later. In some embodiments, a confused-looking audience may result in increased weight values for some or all potential contributions. In some embodiments, operation 104 may include, in response to detecting a confused-looking audience, determining a simple "clarify" contribution would be beneficial and/or necessary.

Once one or more potential contributions are determined, method 100 further includes determining if and/or when the potential contributions are appropriate for submission 106. This may include, for example, waiting to enable the presenter/presentation to cover or address the topic of the potential contribution. In some embodiments, if the potential contribution is a full-sentence question, operation 106 may include waiting for an opportunity to pose the question without unnecessarily interrupting the presenter or presentation. For example, operation 106 may include determining, based on speech recognition, whether a presenter has completed a sentence and has briefly stopped speaking (i.e., a natural break). In some embodiments, operation 106 may include determining whether a subject of the presentation has changed (for example, if the presenter has moved on to another subject). In some embodiments, if the subject has changed and the topic of the potential contribution was not addressed, operation 106 may include determining whether the potential contribution should be posed immediately or stored to be submitted at a later time (such as at or near the end of the presentation, during a "General Questions" portion of the presentation, etc.).

In some embodiments, the determination of operation 106 may be based, at least in part, on the detected emotional state of one or more audience members. This may help indicate whether a question needs to be asked or if the audience is likely to ask it. For example, if facial recognition information indicates that the audience is confused, then a system such as system 200 of FIG. 2 may be more likely to make the potential contribution(s), or at least more likely to make them sooner rather than later. Similarly, in the information indicates that the audience is uncomfortable, this may indicate that one or more audience members are unwilling to ask a particular question. Based on historical data (such as, for example, data correlating uncomfortable audience members becoming less uncomfortable after a particular question is asked), this may further indicate that the audience is hesitant to ask a question and thus that the contribution should be made.

In some embodiments, operation 106 may include determining whether the potential contribution is likely to be addressed. This may include, for example, analysis of presentation materials (if available), review of historical/aggregated data regarding similar presentations, particularly those given by the same presenter, etc. If the potential contribution is likely to be addressed within a timeframe (for example, within one minute), the potential contribution may be considered inappropriate for submission until the timeframe has expired. In some embodiments, the detected emotional state of the audience may be considered in combination with a determined likelihood; even if the contribution is likely to be addressed, if the audience appears confused, it may be appropriate to submit the contribution anyway to address the confusion promptly. In some embodiments, a determination that the contribution will be addressed may result in modifying the contribution (for example, to reassure the audience that a specific question will be covered soon).

Method 100 further includes making the appropriate contribution(s) 108. This may include, for example, audibly asking a question (via text-to-speech (TTS) and one or more speakers), displaying a question in digital text format on a screen, submitting a question to a questions queue, etc. In some embodiments, the contribution may be made to the presenter, the audience, or a combination thereof. In some embodiments, operation 108 includes indicating a pending contribution. For example, operation 108 may include activating a light to indicate to the presenter that method 100 has determined an appropriate contribution. The presenter may then choose to review the contribution and decide whether to address the contribution or to disregard it.

Method 100 further includes monitoring a response to the contribution(s) 110. This may include, for example, monitoring how one or more presenters and/or audience members react to a submitted contribution. For example, if the contribution was a question, operation 110 may include recording a presenter's answer to the question or that a presenter declined or failed to answer the question. If the contribution was a suggestion to clarify, operation 110 may include determining whether (and if so, how) the presenter actually clarified the suggested topic.

In some embodiments, operation 110 may include identifying a change in an audience emotional state. This change may be based on, for example, a comparison between a previous emotional state (identified and recorded before the contribution was made) and a subsequent emotional state (identified and recorded as and/or after the contribution was made). An emotional state of the audience may be determined based on image and/or facial recognition information from one or more cameras, as described above. In some embodiments, this emotional state information may be generalized to an entire audience (for example, the emotional state of all audience members may be aggregated and anonymized), while in some embodiments, the emotional state for each identified audience member may be considered. In some embodiments, emotional state of the presenter(s) may be monitored in addition to or instead of the emotional state of the audience (and/or specifics audience members).

Method 100 further includes updating a knowledge base 112. This may include determining a degree of success of the contribution. For example, if a contribution was submitted but the presenter declined to address it, this may indicate that the contribution should not have been made, and thus the determinations made at operations 104-108 may have been in error. However, the possibility that the error lies with the presenter in refusing to address the contribution is fully contemplated herein; a determination that the contribution was made in error may be mitigated, at least in part, based on the emotional state of the presenter and/or audience. For example, if the audience continues to appear confused, or if the presenter appears nervous or irritated, this may reduce an amplitude of a determined error. In some embodiments, a determination that the contribution was a success may be made if the contribution is addressed by the presenter (and, in some embodiments, if the emotional state of the audience indicates a decrease in confusion or other applicable emotional response such as increased happiness).

In some embodiments, operation 112 may include adjusting one or more parameters of a machine learning system based on a determination of contribution success. This may enable a system to make more accurate determinations in future iterations of method 100. Further, operations 112 may include associating information gathered from operation 110 with the outcomes of operations 102-108. For example, operation 112 may include updating one or more arrays to indicate whether the operations performed at 102-108 resulted in a success, a failure, a partial success, etc. The system may rely on this information to adjust future executions of method 100. For example, a system may be less likely to proceed in making the same contribution at operation 104 if a previous response to the same contribution was negative (as indicated by, for example, a refusal by the presenter to address the contribution or an emotional response of the audience, etc.). Operation 112 may account for information gathered at operation 102 as well; if a first audience detected and analyzed during a first presentation is similar to a second audience detected and analyzed during a second presentation, then outcomes/responses to contributions made during the first presentation may have a stronger effect on determinations made during the second presentation.

In some embodiments, operation 112 may further include determining whether contributions that were not made during a presentation should have been made. This may include contributions that were considered (i.e., determined at operation 104 but dismissed as unnecessary/inappropriate at operation 106) or contributions that were not considered. For example, if an audience is detected to be confused until an audience member asks a question, after which the audience's confusion is reduced (by, for example, 50% of audience members appearing confused, a 30% reduction in confidence that one or more audience members are confused, etc.), then that question and/or answer may be recorded into the knowledge base to be considered during later presentations. The question and/or answer in the knowledge base may further include a weight tag to identify, for example, a significance of impact on audience confusion.

In some embodiments, the system may wait to give audience members a chance to ask the question. In some embodiments, the system may pose a list of questions/topics for the presenter to cover, and automatically update the list as topics are detected to have been covered.

Figure 2:
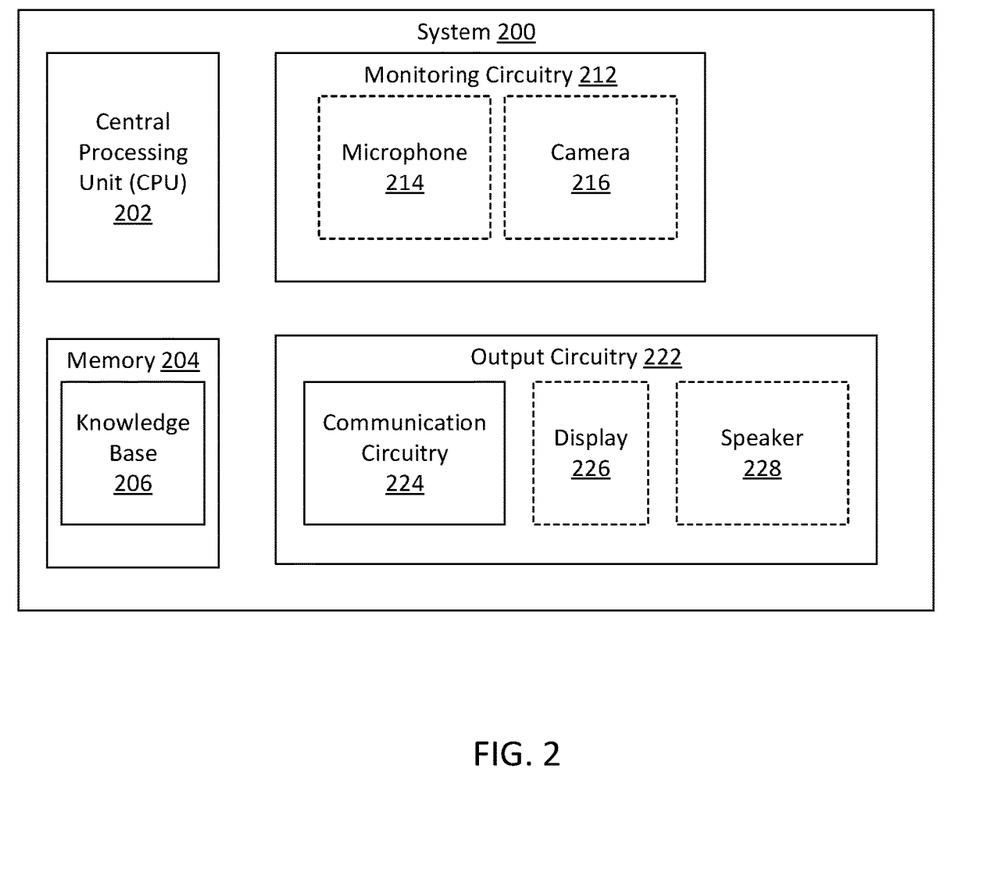
FIG. 2 illustrates a high-level block diagram of an audience augmentation system consistent with several embodiments of the present disclosure.

FIG. 2 illustrates a high-level block diagram of an audience augmentation system 200 consistent with several embodiments of the present disclosure. System 200 includes a central processing unit (CPU) 202, memory subsystem 204 including a knowledge base 206, monitoring circuitry 212 and output circuitry 222. System 200 may be configured to perform audience augmentation operations such as, for example, operations 102-112 of method 100 (FIG. 1).

Memory subsystem 204 is configured to store a knowledge base 206, which may include, for example, one or more arrays indicating machine learning parameters, correlations (for example, correlations between subjects, topics, and contributions, etc.), and the like. In some embodiments, knowledge base 206 may be stored in nonvolatile storage such as one or more hard disk drives, solid state drives, etc.

Monitoring circuitry 212 may include one or more microphones 214 and/or one or more cameras 216 configured to receive information. This information is used by system 200 to perform monitoring operations, such as, for example, monitoring a presentation (as in operation 102 of FIG. 1) or monitoring a response to a contribution (as in operation 110 of FIG. 1).

Output circuitry 222 includes communication circuitry 224 and may further include one or more displays 226 and/or speakers 228 to enable system 200 to make contributions during a presentation. Communication circuitry 224 is configured to communicate contributions to external systems and/or users via, for example, the internet, Wi-Fi, Bluetooth, near-field communications (NFC), etc. For example, if system 200 determines that a question is appropriate to ask during a presentation, communication circuitry 224 may transmit the question to a presenter's system via Wi-Fi, enabling the presenter to view the question on the presenter's system and respond to the question during the presentation. In some embodiments, system 200 may display the contribution via one or more displays 226 (such as causing question to appear in text format on a screen). In some embodiments, system 200 may ask the question via one or more speakers 228 (such as causing the speakers to produce sound based on an output of text-to-speech operations performed on a question by CPU 202).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
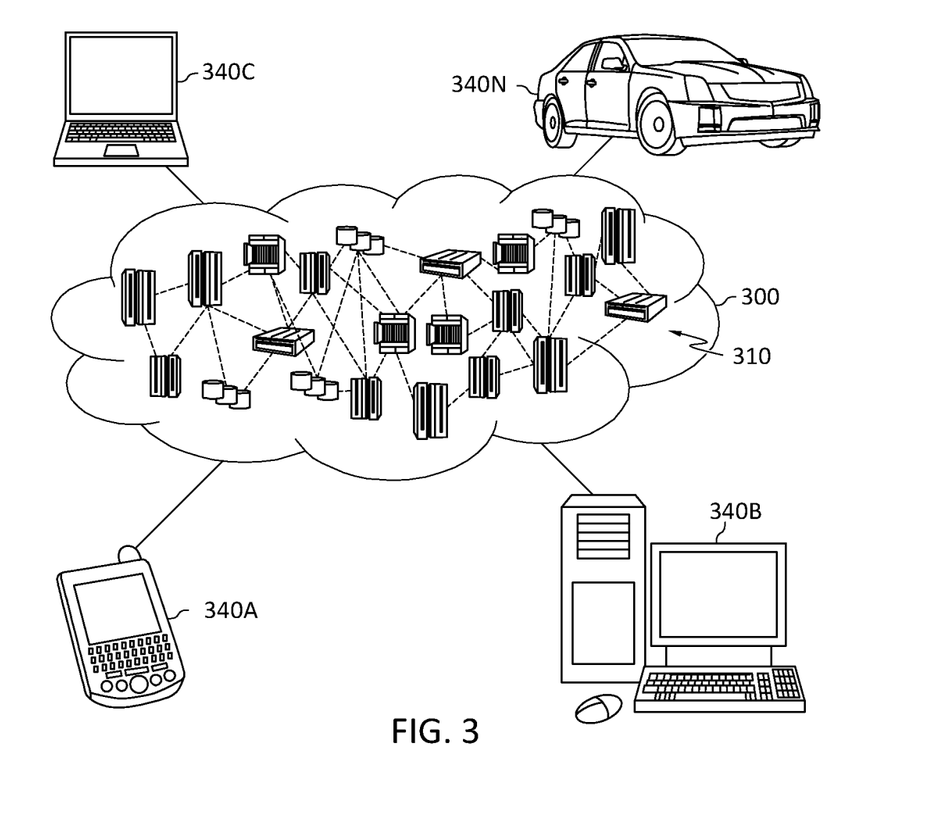
FIG. 3 depicts a cloud computing environment according to an embodiment of the present disclosure.

Referring now to FIG. 3, illustrative cloud computing environment 300 is depicted. As shown, cloud computing environment 300 comprises one or more cloud computing nodes 310 with which local computing devices used by cloud consumers, such as, for example, personal digital assistant (PDA) or cellular telephone 340A, desktop computer 340B, laptop computer 340C, and/or automobile computer system 340N may communicate. Nodes 310 may communicate with one another. They may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of computing devices 340A-N shown in FIG. 3 are intended to be illustrative only and that computing nodes 310 and cloud computing environment 300 can communicate with any type of computerized device over any type of network and/or network addressable connection (e.g., using a web browser).

Figure 4:
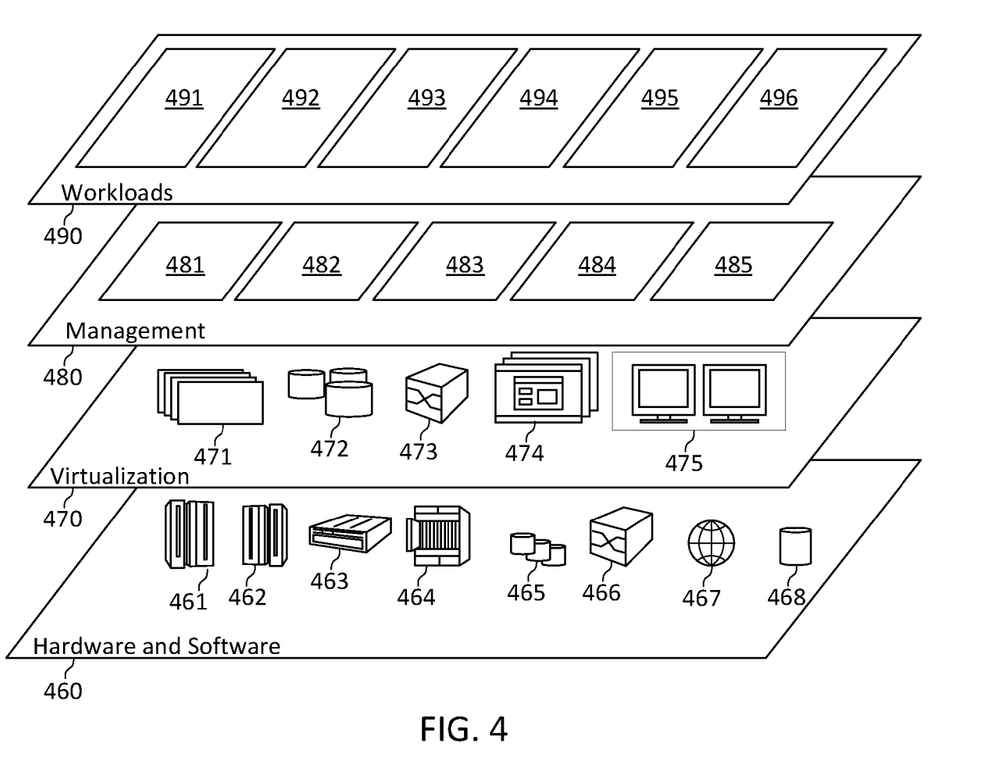
FIG. 4 depicts abstraction model layers according to an embodiment of the present disclosure.

Referring now to FIG. 4, a set of functional abstraction layers provided by cloud computing environment 300 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment. Metering and pricing 482 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: mapping and navigation 491; software development and lifecycle management 492; virtual classroom education delivery 493; data analytics processing 494; transaction processing 495; and audience augmenting 496.

Figure 5:
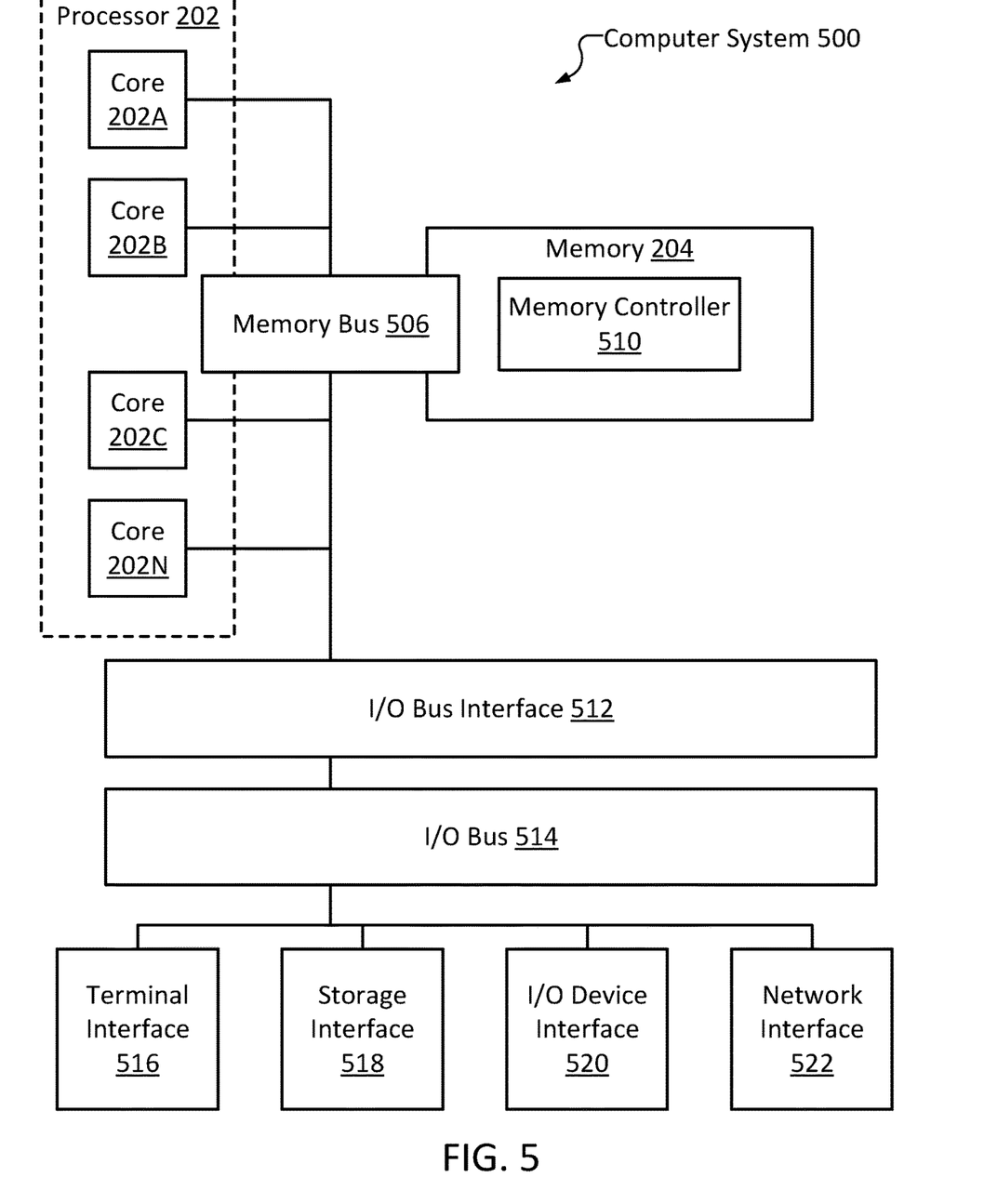
FIG. 5 illustrates a high-level block diagram of an example computer system that may be used in implementing embodiments of the present disclosure.

Referring now to FIG. 5, shown is a high-level block diagram of an example computer system 500 that may be configured to perform various aspects of the present disclosure, including, for example, method 100. The example computer system 500 may be used in implementing one or more of the methods or modules, and any related functions or operations, described herein (e.g., using one or more processor circuits or computer processors of the computer), in accordance with embodiments of the present disclosure. In some embodiments, the major components of the computer system 500 may comprise a CPU 202 with one or more CPU cores 202, a memory subsystem 204, a terminal interface 516, a storage interface 518, an I/O (Input/Output) device interface 520, and a network interface 522, all of which may be communicatively coupled, directly or indirectly, for inter-component communication via a memory bus 506, an I/O bus 514, and an I/O bus interface unit 512.

The computer system 500 may contain one or more general-purpose programmable central processing units (CPUs) 202, some or all of which may include one or more cores 202A, 202B, 202C and 202N, herein generically referred to as the CPU 202. In some embodiments, the computer system 500 may contain multiple processors typical of a relatively large system; however, in other embodiments the computer system 500 may alternatively be a single CPU system. Each CPU 202 may execute instructions stored in the memory subsystem 204 on a CPU core 202 and may comprise one or more levels of on-board cache.

In some embodiments, the memory subsystem 204 may comprise a random-access semiconductor memory, storage device, or storage medium (either volatile or non-volatile) for storing data and programs. In some embodiments, the memory subsystem 204 may represent the entire virtual memory of the computer system 500 and may also include the virtual memory of other computer systems coupled to the computer system 500 or connected via a network. The memory subsystem 204 may be conceptually a single monolithic entity, but, in some embodiments, the memory subsystem 204 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 204 may contain elements for control and flow of memory used by the CPU 202. This may include a memory controller 510.

Although the memory bus 532 is shown in FIG. 5 as a single bus structure providing a direct communication path among the CPU 202, the memory subsystem 204, and the I/O bus interface 512, the memory bus 532 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 512 and the I/O bus 514 are shown as single respective units, the computer system 500 may, in some embodiments, contain multiple I/O bus interface units 512, multiple I/O buses 514, or both. Further, while multiple I/O interface units are shown, which separate the I/O bus 514 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
   generating a knowledge base, wherein the generating comprises:
      obtaining speech data and image data from a set of monitored presentations related to a first subject;
      generating a set of topics correlated with the first subject based on keywords from the speech data; and
      generating a set of audience reactions correlated with the first subject, wherein the set of audience reactions comprises at least one facial expression extracted from the obtained image data;
   monitoring a presentation, the presentation including an audience having one or more audience members, wherein the monitoring comprises:
      receiving audio and image data from the presentation;
      extracting speech data from the received audio; and
      extracting facial expressions of the one or more audience members from the received image data;

determining, based on the facial expressions, categories of audience reactions during a first timeframe of the monitored presentation;

determining, based on at least one keyword from the extracted speech data, that the presentation is related to the first subject;

in response to determining that the presentation is related to the first subject, selecting a potential contribution, wherein the potential contribution comprises a prompt for a topic from the set of topics;

determining that the potential contribution is an appropriate contribution, wherein the determining comprises:

determining, based on the categories, that more than a threshold number of the audience reactions during the first timeframe belong to a first category; and determining, based on the extracted keywords, that the topic has not been addressed; and responsive to the determination that the potential contribution is an appropriate contribution, generating the prompt.

2. The method of claim 1, further comprising:
based on the monitoring, determining a response to the prompt; and
updating the knowledge base based on the response.

3. The method of claim 2, wherein the determining the response comprises determining categories of audience reactions during a timeframe of the monitored presentation that is after the generating the prompt.

4. The method of claim 1, wherein the knowledge base comprises a plurality of machine learning parameters.

5. The method of claim 1, wherein the determining the categories comprises:
receiving, from a camera, an image of an audience member from the one or more audience members;
identifying, via facial recognition of the image, a facial expression of the audience member; and
determining, based on the facial expression, an emotion of the audience member.

6. The method of claim 1, wherein the generating the prompt comprises indicating to a presenter that the appropriate contribution has been determined.

7. The method of claim 6, wherein the indicating to the presenter comprises causing a presenter's display to depict the appropriate contribution.

8. The method of claim 1, wherein the generating the prompt comprises asking, via one or more output devices, a question.

9. The method of claim 1, further comprising determining categories of audience reactions during a second timeframe of the monitored presentation.

10. The method of claim 9, further comprising determining that more than a threshold number of the audience reactions during the second timeframe of the monitored presentation belong to a second category.

11. The method of claim 1, wherein the speech data comprises speech data from at least one of the audience members and speech data from a presenter.

12. The method of claim 11, further comprising determining a category of the audience reaction based on the speech data.

13. The method of claim 1, wherein the determining that the potential contribution is an appropriate contribution further comprises determining a likelihood of the topic being addressed in a next timeframe of the monitored presentation.

14. A system comprising:
a memory; and
a central processing unit (CPU) including a plurality of CPU cores configured to:
generate a knowledge base, wherein the generating comprises:
obtaining speech data and image data from a set of monitored presentations related to a first subject;
generating a set of topics correlated with the first subject based on keywords from the speech data; and
generating a set of audience reactions correlated with the first subject, wherein the set of audience reactions comprises at least one facial expression extracted from the obtained image data;
monitor a presentation, the presentation including an audience having one or more audience members, wherein the monitoring comprises:
receiving audio and image data from the presentation;
extracting speech data from the received audio; and
extracting facial expressions of the one or more audience members from the received image data;
determine, based on the facial expressions, categories of audience reactions during a first timeframe of the monitored presentation;
determine, based on at least one keyword from the extracted speech data, that the presentation is related to the first subject;
in response to determining that the presentation is related to the first subject, selecting a potential contribution;
determine that the potential contribution is an appropriate contribution, wherein the determining comprises:
determining, based on the categories, that more than a threshold number of the audience reactions during the first timeframe belong to a first category; and
determining, based on the extracted keywords, that the topic has not been addressed; and
responsive to the determination that the potential contribution is an appropriate contribution, generate the prompt.

15. The system of claim 14, wherein the CPU is further configured to:
determine a response to the prompt based on the monitoring; and
update the knowledge base based on the response.

16. The system of claim 15, wherein the knowledge base comprises a plurality of machine learning parameters.

17. The system of claim 14, wherein the generating the prompt comprises indicating to a presenter that the appropriate contribution has been determined.

18. The system of claim 14, wherein the generating the prompt comprises asking, via one or more output devices, a question.

19. A computer program product, the computer program product comprising a non-transitory computer readable storage medium having program instructions embodied therewith, the program instructions executable by a computer to cause the computer to:
generate a knowledge base, wherein the generating comprises:
obtaining speech data and image data from a set of monitored presentations related to a first subject;

generating a set of topics correlated with the first subject based on keywords from the speech data; and generating a set of audience reactions correlated with the first subject, wherein the set of audience reactions comprises at least one facial expression extracted from the obtained image data;

monitor a presentation, the presentation including an audience having one or more audience members, wherein the monitoring comprises:

receiving audio and image data from the presentation;

extracting speech data from the received audio; and extracting facial expressions of the one or more audience members from the received image data;

determine, based on the facial expressions, categories of audience reactions during a first timeframe of the monitored presentation;

determine, based on at least one keyword from the extracted speech data, that the presentation is related to the first subject;

in response to determining that the presentation is related to the first subject, selecting a potential contribution, wherein the potential contribution comprises a prompt for a topic from the set of topics;

determine that the potential contribution is an appropriate contribution, wherein the determining comprises:

determining, based on the categories, that more than a threshold number of the audience reactions during the first timeframe belong to a first category; and determining, based on the extracted keywords, that the topic has not been addressed; and responsive to the determination that the potential contribution is an appropriate contribution, generate the prompt.

20. The computer program product of claim 19, wherein the instructions further cause the computer to:

determine a response to the prompt based on the monitoring; and update the knowledge base based on the response.

* * * * *